United States Patent
Chi et al.

(10) Patent No.: US 9,633,801 B2
(45) Date of Patent: Apr. 25, 2017

(54) TOUCH DEVICE AND FABRICATION METHOD THEREOF

(71) Applicant: TPK TOUCH SOLUTIONS (XIAMEN) INC., Xiamen (CN)

(72) Inventors: Ho-Hsun Chi, Hsinchu (TW); Tsung-Ke Chiu, Tainan (TW); Huilin Ye, Zhangzhou (CN); Jing Yu, Xiamen (CN)

(73) Assignee: TPK Touch Solutions (XIAMEN) Inc., Xiamen (CN)

( * ) Notice: Subject to any disclaimer, the term of this patent is extended or adjusted under 35 U.S.C. 154(b) by 454 days.

(21) Appl. No.: 13/969,617

(22) Filed: Aug. 19, 2013

(65) Prior Publication Data
US 2014/0054145 A1 Feb. 27, 2014

(30) Foreign Application Priority Data

Aug. 21, 2012 (CN) .......................... 2012 1 0299286

(51) Int. Cl.
*B32B 7/02* (2006.01)
*H05K 3/00* (2006.01)
(Continued)

(52) U.S. Cl.
CPC .............. *H01H 9/18* (2013.01); *G06F 3/041* (2013.01); *H01H 11/00* (2013.01); *G06F 2203/04103* (2013.01); *Y10T 29/49105* (2015.01)

(58) Field of Classification Search
None
See application file for complete search history.

(56) References Cited

U.S. PATENT DOCUMENTS

2008/0165139 A1* 7/2008 Hotelling ................ G06F 3/041
  345/173
2009/0207151 A1* 8/2009 Liu .......................... G06F 3/044
  345/174

(Continued)

FOREIGN PATENT DOCUMENTS

CN    201174007 Y    12/2008
CN    201622557 U    11/2010

OTHER PUBLICATIONS

Riso Hienonen & Reima Laytinen, "Corrosion and climatic effects in electronics," 2007, VTT, Publication 626. http://www.vtt.fi/inf/pdf/publications/2007/P626.pdf.*

*Primary Examiner* — David Sample
*Assistant Examiner* — Nicole T Gugliotta
(74) *Attorney, Agent, or Firm* — Cooper Legal Group, LLC

(57) ABSTRACT

A touch device including a touch panel is provided. The touch panel includes a substrate having a touching surface and a bonding surface opposite to the touching surface, and further having a viewable area and a non-viewable area surrounding the viewable area. A colorful decoration layer is disposed on the bonding surface of the substrate and at the non-viewable area. The colorful decoration layer has a gradient side adjacent to the viewable area. A planarization layer completely covers the gradient side of the colorful decoration layer and the bonding surface of the substrate. A touch sensing layer is disposed on the planarization layer and extended from the viewable area to the non-viewable area. Further, a method for fabricating a touch device is provided.

20 Claims, 8 Drawing Sheets

(51) Int. Cl.
  *H01C 17/02*  (2006.01)
  *H01H 9/18*  (2006.01)
  *H01H 11/00*  (2006.01)
  *G06F 3/041*  (2006.01)

(56) References Cited

U.S. PATENT DOCUMENTS

| | | | | |
|---|---|---|---|---|
| 2012/0026107 A1* | 2/2012 | Kim | ......................... | G06F 3/044 |
| | | | | 345/173 |
| 2012/0050173 A1* | 3/2012 | Chou | ....................... | G06F 3/041 |
| | | | | 345/173 |
| 2012/0249453 A1* | 10/2012 | Tsukamoto | ............. | G06F 3/041 |
| | | | | 345/173 |
| 2013/0082961 A1* | 4/2013 | Wang | ....................... | G06F 3/044 |
| | | | | 345/173 |
| 2013/0100039 A1* | 4/2013 | Hong | ................. | B32B 37/1207 |
| | | | | 345/173 |

* cited by examiner

TOUCH DEVICE AND FABRICATION METHOD THEREOF

BACKGROUND OF THE INVENTION

This Application claims priority of the People's Republic of China Patent Application No. 201210299286.9, filed on Aug. 21, 2012, the entirety of which is incorporated herein by reference.

Field of the Invention

The present invention relates to touch device technology, and in particular, relates to a decoration layer design of a touch panel in a touch device.

Description of the Related Art

Recently, touch panel techniques have been developed to be a main input method and have been popularly applied in various electronic products, such as mobile phones, personal digital assistants (PDAs) and handheld personal computers. In the electronic products with touch devices, touch panels used therein usually include a substrate and several elements formed on the substrate, such as touch sensing electrodes, a black decoration layer and a touch signal conveying trace, etc. The substrate of the touch panel is provided for protection and to be a carrier for the elements formed thereon. The substrate can be divided into a viewable area and a non-viewable area surrounding the viewable area. The touch sensing electrodes are disposed in the viewable area of the substrate. The touch signal conveying trace is disposed in the non-viewable area of the substrate for electrically connecting the touch sensing electrodes to an external circuit, for example, a flexible printed circuit. Because the touch signal conveying trace is usually formed from a metal material, a black decoration layer is formed above the touch signal conveying trace at the non-viewable area for masking the touch signal conveying trace.

However, in conventional touch devices, the black decoration layer is formed from a black photo-resist. Thus, there is only one color of the decoration layer in the conventional touch devices and aesthetic decorative appearance of touch devices cannot be achieved.

Also, when the black decoration layer is thick, for example, 10 μm, it is difficult to form other elements on the black decoration layer. For example, when a touch sensing electrode layer is formed in a subsequent process, the touch sensing electrode layer formed at a boundary between the viewable area and the non-viewable area needs to stride across the thick black decoration layer. This causes a breaking problem for the touch sensing electrode layer. Thus, there exists a need for touch devices that overcome the above mentioned problems.

BRIEF SUMMARY OF THE INVENTION

According to embodiments of the invention, touch devices are provided. The embodiments of the invention provide structural designs for a decoration layer of touch devices to satisfy requirements of variability in aesthetic design of touch devices. In addition, the design of the decoration layer of touch device can assist the formation of the planarization layer and enhance the ability of the planarization layer to cover the decoration layer for overcoming the breaking problem mentioned in the related art.

According to an illustrative embodiment, a touch device is provided that includes a touch panel. The touch panel comprises a substrate, having a touching surface and a bonding surface opposite to the touching surface. The substrate further has a viewable area and a non-viewable area surrounding the viewable area. A colorful decoration layer is disposed on the bonding surface of the substrate and at the non-viewable area, wherein the colorful decoration layer has a gradient side adjacent to the viewable area. A planarization layer is provided that completely covers the gradient side of the colorful decoration layer and the bonding surface of the substrate. Further, a touch sensing layer is disposed on the planarization layer and extends from the viewable area to the non-viewable area.

According to another illustrative embodiment, a method for fabricating a touch device is provided. The method comprises: providing a substrate, having a touching surface and a bonding surface opposite to the touching surface, and the substrate further having a viewable area and a non-viewable area surrounding the viewable area; forming a colorful decoration layer on the bonding surface of the substrate and at the non-viewable area, wherein the colorful decoration layer has a gradient side adjacent to the viewable area; forming a planarization layer to completely cover the gradient side of the colorful decoration layer and the bonding surface of the substrate; and forming a touch sensing layer on the planarization layer and the touch sensing layer being extended from the viewable area to the non-viewable area.

According to the embodiments of the invention, a variety of designs for aesthetic appearance of touch devices can be achieved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The touch devices of the invention comprise a touch panel and a display panel. Aesthetic appearance of touch devices can be achieved through the designs of the touch panel structure.

Figure 1:
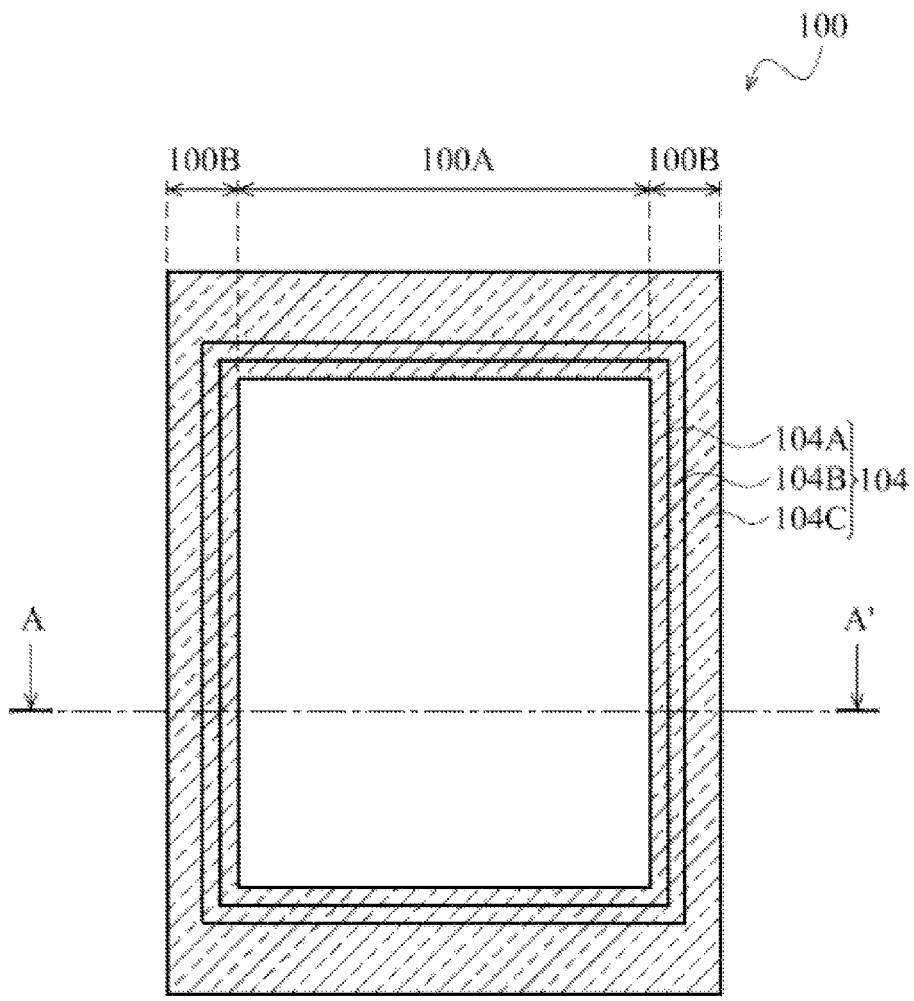
FIG. 1 illustrates a plane view of a colorful decoration layer of a touch panel according to one embodiment of the invention.

Referring to FIG. 1, a plane view of a colorful decoration layer 104 of a touch panel 100 according to one embodiment of the invention is shown. The touch panel 100 has a viewable area 100A and a non-viewable area 100B surrounding the viewable area 100A. In the embodiment, the colorful decoration layer 104 of the touch panel 100 may consist of three layers 104A, 104B and 104C and is disposed in the non-viewable area 100B. In other embodiments, the colorful decoration layer 104 of the touch panel 100 may be a single-layered structure, a two-layered structure or a structure containing other amounts of layers, wherein a structure containing one layer to three layers is preferred.

In various embodiments of the invention, each layer of the colorful decoration layer 104, such as the layers 104A, 104B and 104C, may have a color same as or different from that of the other layers. Moreover, the colors of the layers of the colorful decoration layer 104, such as the layers 104A, 104B and 104C, may be white, or any combination of various colors, or any combination of white and various colors, but do not include black.

As shown in FIG. 1, the insides of the three layers 104A, 104B and 104C of the colorful decoration layer 104 adjacent to the viewable area 100A are not aligned with each other in profile. The insides of the three layers 104A, 104B and 104C have a drop in height with a ladder shape in profile. When the three layers 104A, 104B and 104C have different colors, the appearance of the touch panel 100 is showed with three different colors. The three colors of the three layers 104A, 104B and 104C appear from the outside (the non-viewable area 100B) to the inside (the viewable area 100A) of the touch panel 100 in order. For example, the three colors appearing from the outside to the inside of the touch panel 100 may be white, blue and red in order, or red, green and blue in order, or any combination of various colors. Therefore, the embodiments of the invention can change the colors and the layers of the colorful decoration layer 104 to satisfy aesthetic requirements. Further, aesthetic appearance of touch devices is achieved through the designs of the colorful decoration layer 104 of the touch panel 100.

Figure 2A:
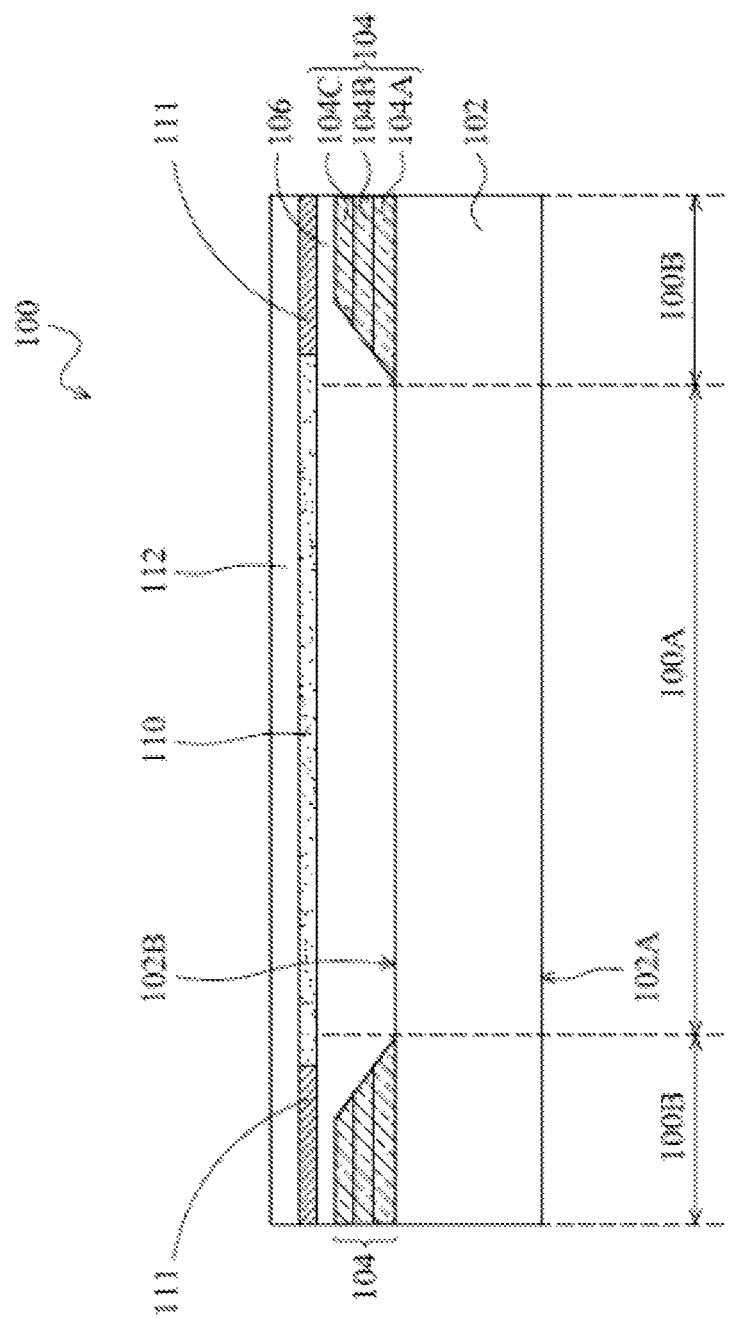
FIG. 2A illustrates a cross section of a touch panel along the cross section line A-A' of FIG. 1 according to one embodiment of the invention.
Figure 3A:
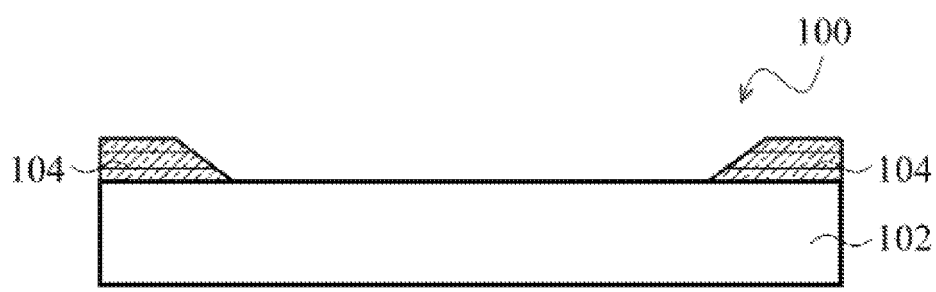
FIGS. 3A-3D illustrate cross sections of intermediate stages for fabricating the touch panel of FIG. 2A and the touch device of FIG. 4 according to one embodiment of the invention.
Figure 3B:
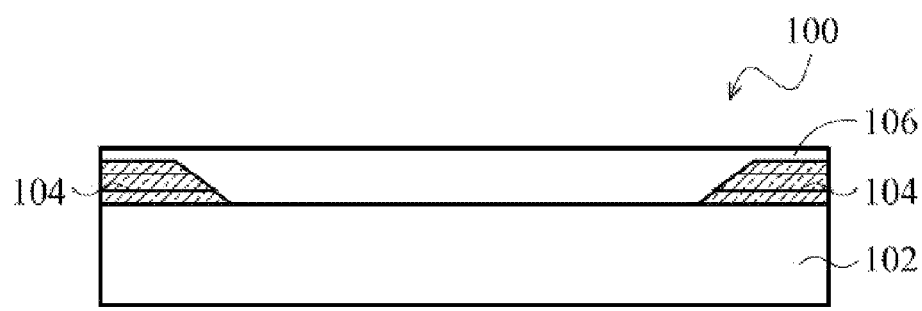
Figure 3C:
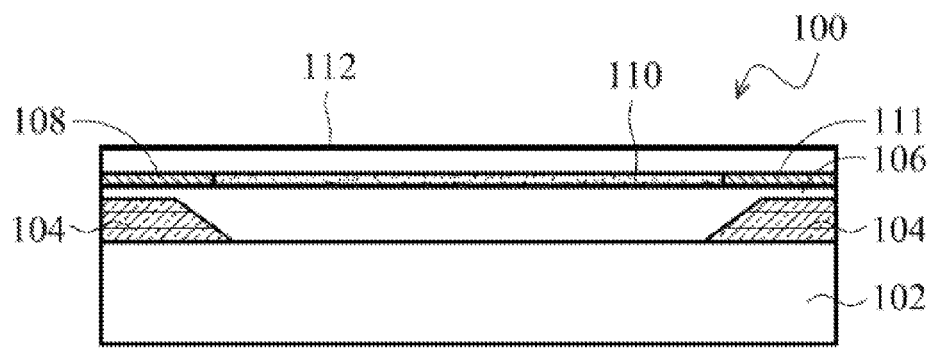
Figure 3D:
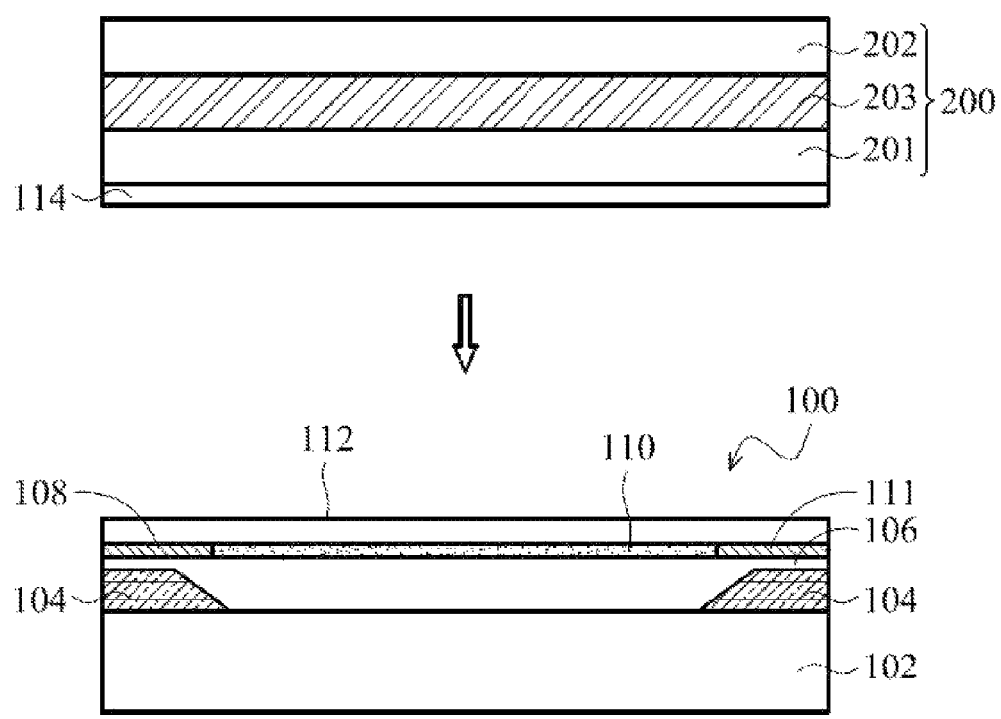
Figure 4:
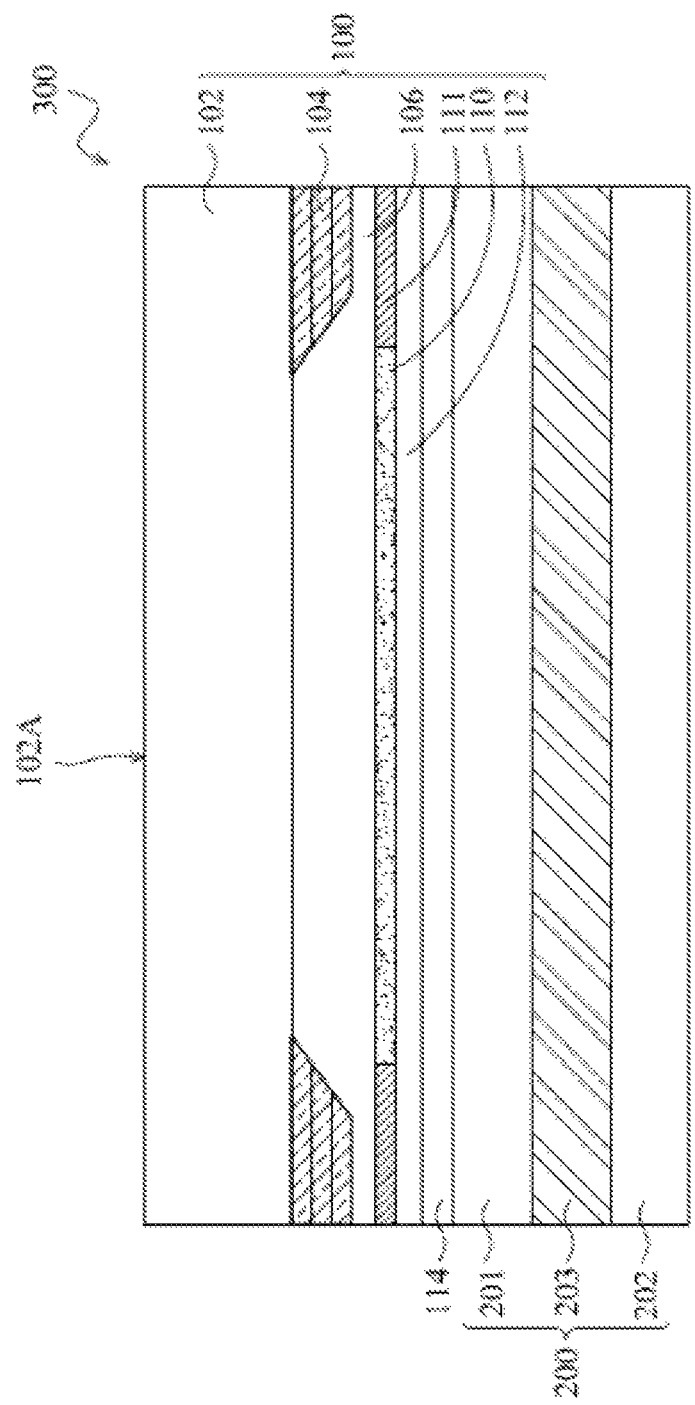
FIG. 4 illustrates a cross section of a touch device according to one embodiment of the invention.

Referring to FIG. 2A, FIGS. 3A-3D and FIG. 4, FIG. 2A shows a cross section of a touch panel 100 along the cross section line A-A' of FIG. 1 according to one embodiment of the invention, FIG. 4 shows a cross section of a touch device 300 including the touch panel 100 according to one embodiment of the invention, and FIGS. 3A-3D show cross sections of intermediate stages for fabricating the touch panel 100 of FIG. 2A and the touch device 300 of FIG. 4 according to one embodiment of the invention.

As shown in FIG. 2A and FIG. 3A, firstly, a substrate 102, for example, a transparent tempered glass substrate or plastic substrate, is provided. The substrate 102 is used as a cover lens of the touch panel 100, having a touching surface 102A and a bonding surface 102B opposite to the touching surface 102A. The bonding surface 102B is used for holding functional elements of the touch panel 100. In below descriptions of FIG. 2A and FIGS. 3A-3D, the orientations of "on", "above", "under" and "below" are used for representing a direction at a state that the touching surface 102A of the touch panel 100 faces downward. The orientations are only used for representing the relationship between relative positions of each element in the touch panel 100.

The three layers 104A, 104B and 104C of the colorful decoration layer 104 are formed on the bonding surface 102B of the substrate 102 in sequence. The colorful decoration layer 104 is disposed in the non-viewable area 100B. The materials of the three layers 104A, 104B and 104C of the colorful decoration layer 104 may include a white printing ink or other colors printing inks. The three layers 104A, 104B and 104C of the colorful decoration layer 104 can be formed by an ink printing process. For example, an ink printing process is performed three times to form the three layers 104A, 104B and 104C of the colorful decoration layer 104 on the non-viewable area 100B of the substrate 102 in sequence. In one embodiment, each layer of the three layers 104A, 104B and 104C may have a thickness of about 10 μm. A total thickness of the colorful decoration layer 104 may be in a range of about 10 μm to about 30 μm.

From a cross section view, an inside of the colorful decoration layer 104 adjacent to the viewable area 100A is a gradient side. In other words, the sides of the three layers 104A, 104B and 104C of the colorful decoration layer 104 adjacent to the viewable area 100A have a ladder-shaped structure in profile. The different colors of the layers of the colorful decoration layer 104 shown in the appearance of the touch panel 100 can be achieved by the ladder-shaped structure in profile consisting of the insides of the layers of the colorful decoration layer 104. Compared with the conventional black decoration layer without a gradient side, the gradient side of the colorful decoration layer 104 can further reduce a gradient of an interface between a subsequently formed planarization layer 106 and the colorful decoration layer 104. The gradient side of the colorful decoration layer 104 assists in the formation of the planarization layer 106 and enhances the ability of the planarization layer 106 to cover the colorful decoration layer 104.

Referring to FIG. 2A and FIG. 3B, the planarization layer 106 is formed to completely cover the gradient side of the colorful decoration layer 104 and the bonding surface 102B of the substrate 102. After the planarization layer 106 is formed, a planar surface can be provided above the substrate 102 and the colorful decoration layer 104. The planar surface assists in the fabrication of subsequently formed elements. The material of the planarization layer 106 may be an inorganic transparent non-conductive material, such as, but not limited to, silicon dioxide ($SiO_2$), silicon nitride, or an organic transparent non-conductive material, such as, but not limited to, a polymer coating material.

Referring to FIG. 2A and FIG. 3C, a touch sensing layer 110 and a touch signal conveying trace 111 are formed on the planarization layer 106. The touch sensing layer 110 includes a plurality of touch sensing electrodes formed of a transparent conductive material. A main portion of the touch sensing layer 110 is disposed on the planarization layer 106 at the viewable area 100A. Moreover, a portion of the touch sensing layer 110 further extends from the viewable area 100A to the non-viewable area 100B on the planarization layer 106. The touch signal conveying trace 111 may be an electrically conductive line made of metal which is disposed in the non-viewable area 100B. The touch signal conveying trace 111 is electrically connected to the touch sensing layer 110, such that an electrical variation signal coming from the touch sensing layer 110 can be conveyed to an external circuit to treat the electrical variation signal.

Then, a protection layer 112 is formed on the touch sensing layer 110 and the touch signal conveying trace 111 to complete the fabrication of the touch panel 100 of FIG. 2A. The material of the protection layer 112 may be an inorganic transparent material, for example, silicon dioxide or silicon nitride. The protection layer 112 formed of inorganic transparent materials can be formed by coating technology. Also, the material of the protection layer 112 may be an organic transparent material, for example, protection films made of polyimide or other polymers. The protection layer 112 formed of polymer protection films can be adhered to the touch sensing layer 110 by adhesion technology.

Referring to FIG. 3D and FIG. 4, a display panel 200 is provided for bonding with the protection layer 112 of the touch panel 100. The display panel 200 includes a first substrate 201 and a second substrate 202, and a display element layer 203 sandwiched between the first substrate 201 and the second substrate 202. In one embodiment, the display panel 200 may be a liquid crystal display panel. In which, the first substrate 201 is a color filter substrate, the second substrate 202 is a thin film transistor array substrate, and the display element layer 203 is a liquid crystal layer. In other embodiments, the display panel 200 may be other kinds of displays, for example, an organic electro luminescence display.

In one embodiment, an adhesive layer 114, for example, an optical clear adhesive layer, is coated on the first substrate 201 of the display panel 200, such that the display panel 200 is bonded with the touch panel 100 through the adhesive layer 114 to form a touch device 300 as shown in FIG. 4.

Figure 2B:
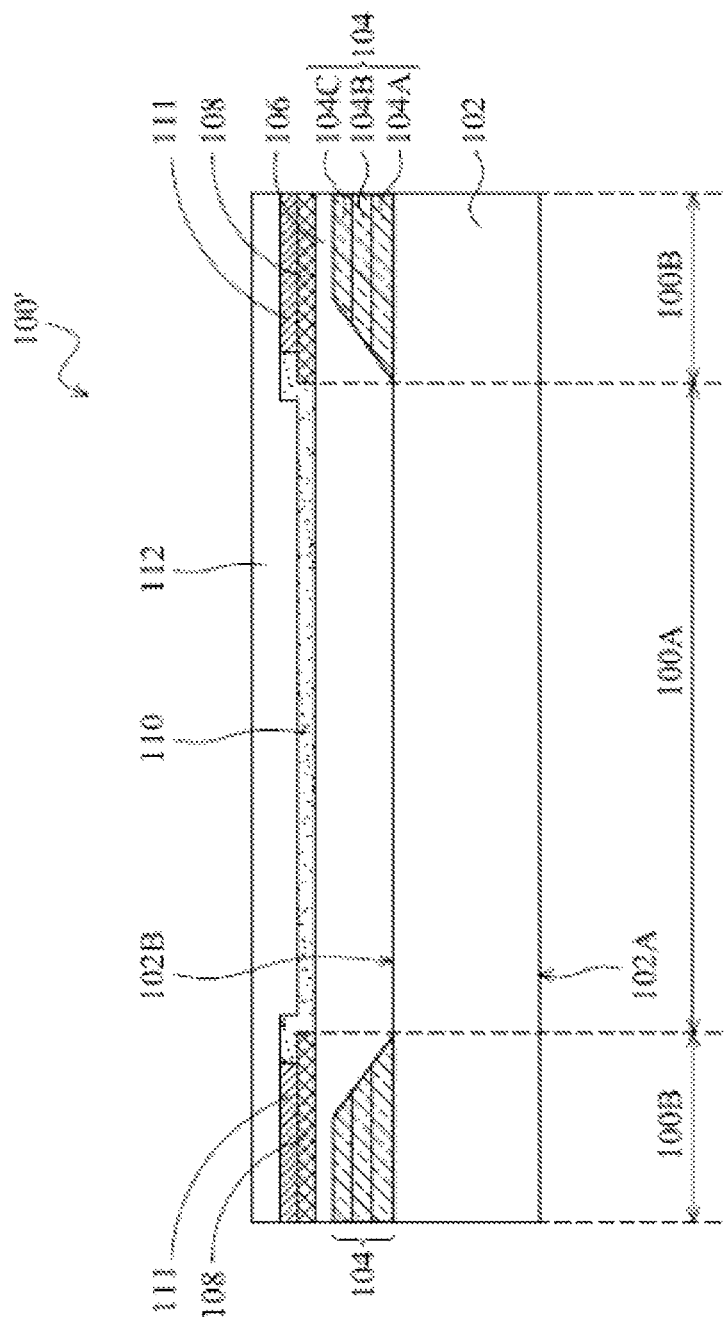
FIG. 2B illustrates a cross section of a touch panel along the cross section line A-A' of FIG. 1 according to another embodiment of the invention.
Figure 5A:
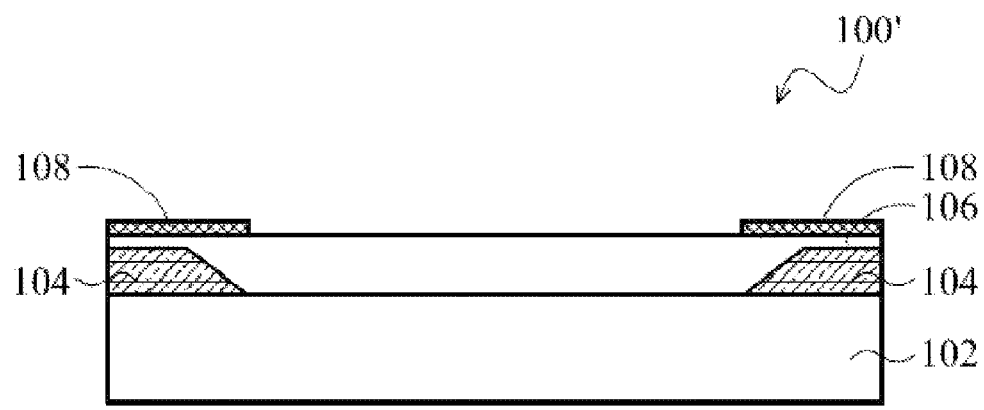
FIGS. 5A-5B illustrate cross sections of intermediate stages for fabricating the touch panel of FIG. 2B and the touch device of FIG. 6 according to another embodiment of the invention.
Figure 5B:
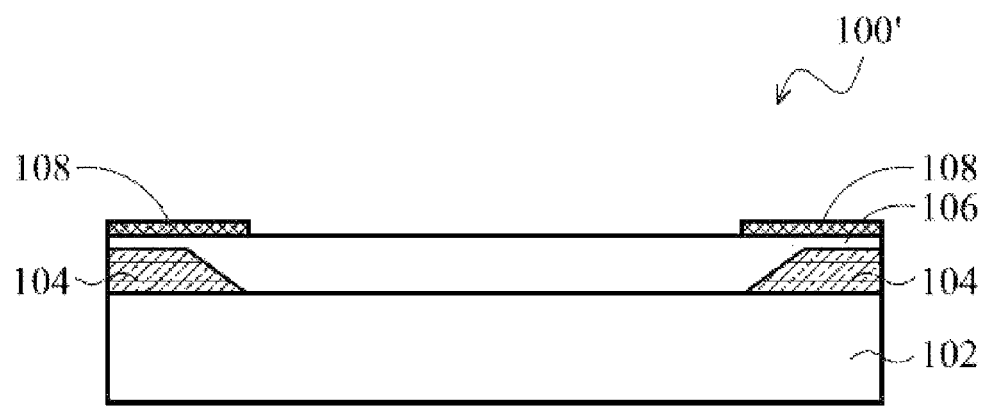
Figure 6:
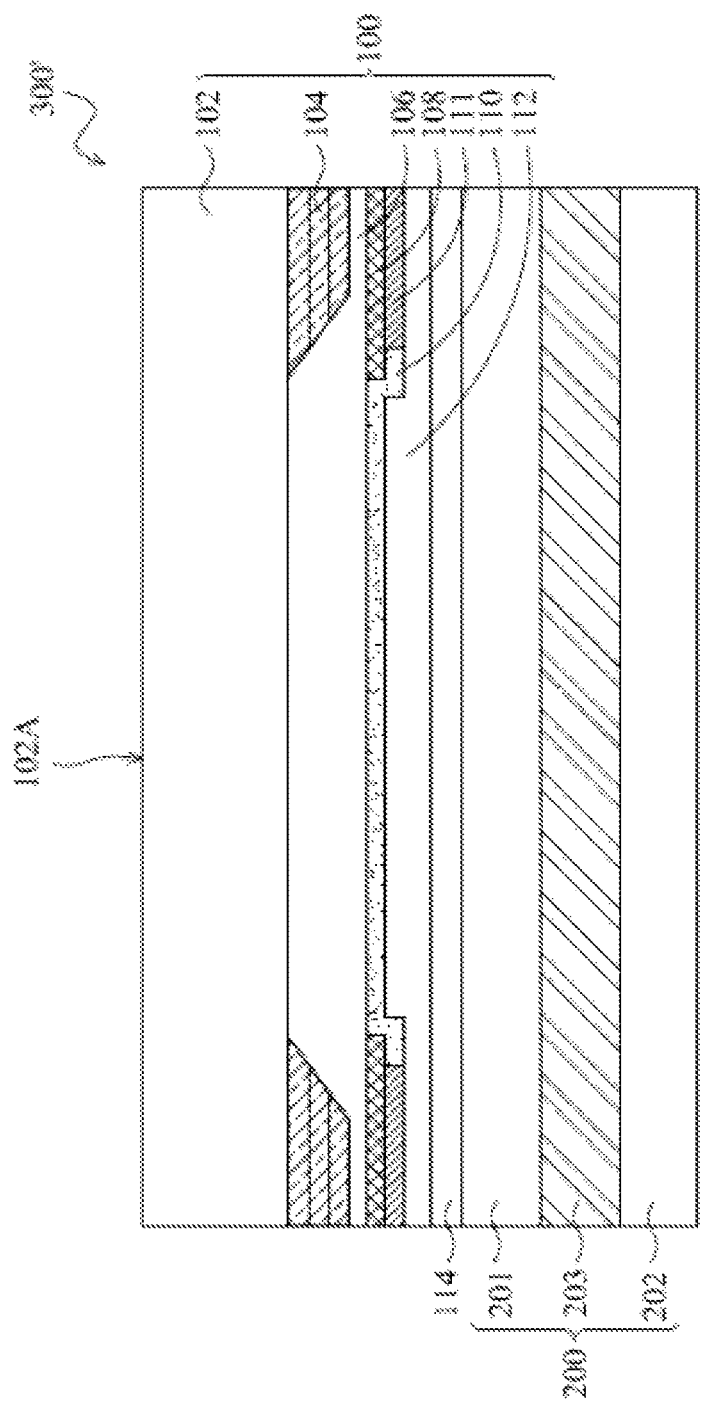
FIG. 6 illustrates a cross section of a touch device according to another embodiment of the invention.

Referring to FIG. 2B, which shows a cross section of a touch panel 100' along the cross section line A-A' of FIG. 1 according to another embodiment of the invention. Then, referring to FIG. 5A, FIG. 5B and FIG. 6, wherein FIGS. 5A and 5B show cross sections of intermediate stages for fabricating the touch panel 100' of the another embodiment, and FIG. 6 show a cross section of a touch device 300' containing the touch panel 100' of the another embodiment, the difference between the above mentioned embodiment and this embodiment is that, in this embodiment, after a planarization layer 106 is formed, a black decoration layer 108 is formed on the planarization layer 106 at the non-viewable area 100B, corresponding to the area with the colorful decoration layer 104 therein. The material of the black decoration layer 108 may be a black photo-resist or a black printing ink. In one embodiment, the black decoration layer 108 has a thickness of about 2 μm to about 4 μm.

Compared with a conventional black decoration layer, the colorful decoration layer 104 may have some degree of being pervious to light. Thus, the touch signal conveying trace 111 may have a viewable problem presented in the touch panel. Therefore, according to the embodiment, the black decoration layer 108 disposed corresponding to the touch signal conveying trace 111 located at the non-viewable area 100B can achieve a better mask effect for the touch signal conveying trace 111. Moreover, the planarization layer 106 can provide a plane surface on the substrate 102 and the colorful decoration layer 104, and the black decoration layer 108 has a thickness of about 2 μm to about 4 μm, which is thinner than a thickness (about 10 μm) of a black photo-resist layer of conventional touch panels. Therefore, in the embodiment of the invention, the touch sensing layer 110 formed on the planarization layer 106 and the black decoration layer 108 does not break. The properties of other elements of the touch panel in the embodiment are the same as that of the above mentioned embodiments, thus they are not repeated again.

The detailed structures of the touch sensing layer 110 and the touch signal conveying trace 111 are not shown in the figures of the above mentioned embodiments. However, one skilled in the art should appreciate that the sensing electrodes of the touch sensing layer 110 can be any pattern designs for the sensing electrodes used in any touch panel. The material of the sensing electrodes may include, for example, nanometer sized silver, indium tin oxide (ITO), indium zinc oxide (IZO), aluminum zinc oxide (AZO) or other suitable transparent conductive materials. The sensing electrodes of the touch sensing layer 110 can be formed by a deposition process, a photolithography process or an etching process.

Referring to FIG. 4 again, the cross section of a touch device 300 according to one embodiment of the invention is shown. The touch device 300 includes the above mentioned touch panel 100 and the display panel 200. The display panel 200 is bonded with the protection layer 112 of the touch panel 100. In the below description of FIG. 4, the orientations of "on", "above", "under" and "below" are used for representing a direction of the touching surface 102A of the touch panel 100 facing upward. The orientations are only used for representing the relationships between relative positions of each element in the touch panel 100. In an actual operation of a touch device, the touching surface 102A of the touch panel 100 is used not only as a touching side for a finger or stylus, but also as a displaying side of a touch device 300.

Compared with the conventional touch panels only having a single colored black photo-resist layer, the colorful decoration layer 104 according to the embodiments of the invention can provide much more selection for the aesthetic appearance of a touch device 300. The conventional touch panels limited by the single colored black photo-resist layer cannot have a variety of aesthetic appearances. In addition, the colorful decoration layer 104 according to the embodiments of the invention can achieve an effect of shielding the touch signal conveying trace 111 at the non-viewable area 100B.

Moreover, compared with the conventional touch panels having a black decoration layer without a gradient side, the colorful decoration layer 104 according to the embodiments of the invention has a gradient side which reduces the gradient of an interface between a subsequently formed planarization layer 106 and a colorful decoration layer 104. The gradient side of the colorful decoration layer 104 also assists in the formation of the planarization layer 106 by providing a non-perpendicular coupling surface to enhance the ability of the planarization layer 106 covering the colorful decoration layer 104. The planarization layer 106 has a plane surface which assists in the fabrication of a subsequently formed touch sensing layer 110 and a touch signal conveying trace 111. In addition, referring to FIG. 6, according to another embodiment of the invention, a black decoration layer 108 is further formed on the planarization layer 106 at the non-viewable area 100B. The black decoration layer 108 is disposed between the touch signal conveying trace 111 and the planarization layer 106, corresponding to the area of the colorful decoration layer 104. Therefore, even if the colorful decoration layer 104 has some degree of being pervious to light, through the black decoration layer 108, a better shielding effect can be provided for the touch signal conveying trace 111 at the non-viewable area 100B to prevent viewing problems of the touch signal conveying trace 111 occurring at the touching surface 102A of the substrate 102.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch device comprising a touch panel, wherein the touch panel comprises:
a substrate having a touching surface and a bonding surface opposite to the touching surface and further having a viewable area and a non-viewable area surrounding the viewable area;
a colorful decoration layer disposed on the bonding surface of the substrate in the non-viewable area, wherein the colorful decoration layer has a gradient side adjacent to the viewable area;
a planarization layer completely covering the gradient side of the colorful decoration layer and the bonding surface of the substrate, wherein the planarization layer covers the colorful decoration layer, and wherein the planarization layer has a planar surface above the substrate and the colorful decoration layer;
a black decoration layer disposed on the planar surface of the planarization layer in the non-viewable area, wherein an entirety of the black decoration layer is vertically coincident with the colorful decoration layer; and
a touch sensing layer disposed on the planar surface of the planarization layer and extending from the viewable area to the non-viewable area.

2. The touch device of claim 1, wherein colors of the colorful decoration layer are selected from a group consisting of white and other colors other than black.

3. The touch device of claim 1, wherein the colorful decoration layer comprises a structure consisting of a plurality of layers.

4. The touch device of claim 3, wherein each layer of the plurality of layers has a color different from that of other layers.

5. The touch device of claim 3, wherein each layer of the plurality of layers has a same color.

6. The touch device of claim 1, wherein the colorful decoration layer has a thickness of 10 μm to 30 μm.

7. The touch device of claim 1, further comprising a touch signal conveying trace disposed on the black decoration layer in the non-viewable area, wherein the touch signal conveying trace is electrically connected to the touch sensing layer.

8. The touch device of claim 1, wherein the black decoration layer and the colorful decoration layer both intersect a vertical axis extending perpendicular to the bonding surface.

9. The touch device of claim 1, wherein the black decoration layer has a thickness of 2 μm to 4 μm.

10. The touch device of claim 7, further comprising:
a protection layer disposed on the touch sensing layer and the touch signal conveying trace and completely covering the viewable area and the non-viewable area;
a display panel; and
an adhesive layer disposed between the display panel and the protection layer.

11. The touch device of claim 10, wherein the display panel comprises:
a first substrate;
a second substrate disposed under the first substrate; and
a display element layer sandwiched between the first substrate and the second substrate.

12. A method for fabricating a touch device, comprising:
providing a substrate having a touching surface and a bonding surface opposite to the touching surface and further having a viewable area and a non-viewable area surrounding the viewable area;
forming a colorful decoration layer on the bonding surface of the substrate in the non-viewable area, wherein the colorful decoration layer has a gradient side adjacent to the viewable area;
forming a planarization layer to completely cover the gradient side of the colorful decoration layer and the bonding surface of the substrate, wherein the planarization layer covers the colorful decoration layer, and wherein the planarization layer has a planar surface above the substrate and the colorful decoration layer;
forming a black decoration layer on the planar surface of the planarization layer in the non-viewable area, wherein an entirety of the black decoration layer is vertically coincident with the colorful decoration layer; and
forming a touch sensing layer on the planar surface of the planarization layer, wherein the touch sensing layer extends from the viewable area to the non-viewable area.

13. The method of claim 12, wherein the forming the colorful decoration layer comprises an ink printing process and the colorful decoration layer comprises a structure consisting of a plurality of layers.

14. The method of claim 12, further comprising forming a touch signal conveying trace on the black decoration layer in the non-viewable area, wherein the touch signal conveying trace is electrically connected to the touch sensing layer.

15. The method of claim 12, wherein the black decoration layer and the colorful decoration layer both intersect a vertical axis extending perpendicular to the bonding surface.

16. The method of claim 14, further comprising forming a protection layer on the touch sensing layer and the touch signal conveying trace to completely cover the viewable area and the non-viewable area.

17. The method of claim 16, further comprising:
providing a display panel;
forming an adhesive layer on the display panel; and
bonding the display panel with the protection layer, wherein the adhesive layer is between the display panel and the protection layer.

18. A touch device, comprising a touch panel, wherein the touch panel comprises:
a substrate having a touching surface and a bonding surface opposite to the touching surface and further having a viewable area and a non-viewable area surrounding the viewable area;
a colorful decoration layer disposed on the bonding surface of the substrate in the non-viewable area, wherein the colorful decoration layer has a gradient side adjacent to the viewable area;
a planarization layer completely covering the gradient side of the colorful decoration layer and the bonding surface of the substrate;
a black decoration layer disposed on the planarization layer in the non-viewable area, wherein an entirety of the black decoration layer is vertically coincident with the colorful decoration layer;
a touch sensing layer disposed on the planarization layer and extending from the viewable area to the non-viewable area; and
a touch signal conveying trace disposed on the black decoration layer, wherein the touch signal conveying trace is electrically connected to the touch sensing layer.

19. The touch device of claim 18, wherein the colorful decoration layer comprises a structure consisting of a plurality of layers, and wherein each layer of the plurality of layers has a color different from that of other layers.

20. The touch device of claim 1, wherein the colorful decoration layer has a thickness of 10 µm to 30 µm, and wherein the black decoration layer has a thickness of 2 µm to 4 µm.

* * * * *